United States Patent [19]

Sanmiya et al.

[11] Patent Number: 4,740,665

[45] Date of Patent: Apr. 26, 1988

[54] APPARATUS FOR AUTOMATICALLY CONTROLLING HEAT INPUT BY HIGH FREQUENCY POWER SOURCE FOR WELDING

[75] Inventors: Seietsu Sanmiya; Shigehisa Miyata, both of Tokai, Japan

[73] Assignee: Nippon Steel Corporation, Tokyo, Japan

[21] Appl. No.: 899,220

[22] PCT Filed: Dec. 6, 1985

[86] PCT No.: PCT/JP85/00674

§ 371 Date: Aug. 6, 1986

§ 102(e) Date: Aug. 6, 1986

[87] PCT Pub. No.: WO86/03443

PCT Pub. Date: Jun. 19, 1986

[30] Foreign Application Priority Data

Dec. 6, 1984 [JP] Japan .................. 59-257916

[51] Int. Cl.$^4$ .......................... B23K 11/08
[52] U.S. Cl. .................... 219/61.2; 219/110
[58] Field of Search ............ 219/61.2, 110

[56] References Cited

U.S. PATENT DOCUMENTS 4,254,323  3/1981  Takamatsu et al. ............... 219/110

FOREIGN PATENT DOCUMENTS 54-33784  3/1979  Japan .
58-17711  2/1983  Japan .

Primary Examiner—Clifford C. Shaw
Attorney, Agent, or Firm—Kenyon & Kenyon

[57] ABSTRACT

Variations of the output frequency (f(i)) of a high frequency power source (1) for welding a steel tube (7) are detected, the maximum and minimum values of the output as a result of this detection of the variations of the output frequency are obtained, the width ($\Delta f$) of the frequency variation is obtained as the difference between the maximum and minimum values, a target value ($\Delta f(T)$) of the width of the frequency variation is obtained, and the output of the high frequency power source (1) is controlled to make the width ($\Delta f$) of frequency variation equal to the target value ($\Delta f(T)$) of the width of the frequency variation, so that an automatic heat input control apparatus of a high frequency power source used for high quality welding of a tube to be electrically welded is realized.

3 Claims, 4 Drawing Sheets

APPARATUS FOR AUTOMATICALLY CONTROLLING HEAT INPUT BY HIGH FREQUENCY POWER SOURCE FOR WELDING

DESCRIPTION

1. Technical Field

The present invention relates to an apparatus for automatically controlling the heat input by a high frequency power source of welding. The apparatus according to the present invention is used, for example, for an automatic control of heat input during a high quality, high frequency welding of a tube to be electrically welded.

2. Background Art

In general, in the process for manufacturing an electric welded steel tube wherein a steel plate is bent into the form of a pipe and the butt joints of the edges of the bent steel plate are welded by high frequency welding, it is necessary to control the heat input to the optimal state and, therefore, variations of the frequency of the power source for the welding are monitored and a control of the heat input is carried out to obtain an optimal frequency of the power source for the welding.

A so-called V shape groove is formed in the electrically welded portion during welding, and the ridge of this V shape groove constitutes the welding point. However, the position of this welding point is not settled, and is varied to a small or large extent in accordance with the condition of the welding. For example, no variation of the welding point takes place when the level of the heat input is low, but the position of the welding point is varied with a certain amplitude and a certain frequency when the level of the heat input is high. For example, it is possible to classify the phenomena of welding into first, second, and third types, as follows. That is, the phenomenon in which the variation of the position of the welding point is small is the first type of welding phenomenon, the phenomenon in which the variation of the position of the welding point is medium is the second type of welding phenomenon, and the phenomenon in which the variation of the position of the welding is large and unlimited is the third type of welding phenomenon. By detecting to which type of welding phenomenon the present state belongs, and regulating the condition of welding to attain the desirable welding phenomenon, it is possible to attain a good quality welding. When the welding point is varied, the load of the high frequency oscillation circuit constituting the welding power source is varied, and the output oscillation frequency, the phase difference between the output voltage and current, and the output power are varied. Hence, by detecting one of the above-described variables, it is possible to detect the variation in the position of the welding point and to determine to which of the first to third types of the welding phenomena the present welding phenomenon belongs. In the case of the usual electrical seam welding, if the variations of the frequency or cycle period of the power source are detected and the control of heat input is carried out to attain the second type of welding phenomenon, it is possible to perform a suitable welding.

In the prior arts, for carrying out a control such as described above, the inverse of the width $\Delta f$ of variation of frequency, and accordingly, the width $\Delta(1/f)$ of the variation of a cycle period, are detected, and the output of the high frequency power source for welding is controlled to make the detected width $\Delta(1/f)$ of variation of cycle period equal to the target optimal value of $\Delta(1/f)(T)$. The steel pipe to be welded is the load of the power source, that is the high frequency oscillation circuit. The welding state has an influence on the oscillation frequency $f(i)$ of the high frequency oscillation circuit. When the welding state is changed, the position of the welding point is changed, and accordingly, the oscillation frequency is changed. The frequency $f(i)$ is supplied to the 1/f counter, the output of which is frequency-divided, for example, divided by 100, by a frequency divider. A pulse corresponding to the rising or falling edge of the frequency divided output f/100 is generated by a monostable multivibrator. The generated pulse is supplied to a latch circuit through a counter circuit. A first output pulse of the monostable multivibrator representing the detection of the rising edge causes the count of the counter circuit to be received by the latch circuit, while a later output pulse of the monostable multivibrator representing the detection of the falling edge causes the value set in a setting device to be received by the counter circuit. Upon loading of the set value, the counter carries out a down-counting of the number of received output pulses of the oscillator from the set value and produces the data of the remainder. The count at the moment when the monostable multivibrator produces an output, that is, the remainder value which is the result of the subtraction of the number of pulses received from the output terminal of the oscillator from the set value, is received by the latch circuit.

The frequency $f(i)$ is, for example, 400 KHz. Hence, the cycle period as the result of the division by 100 of the frequency 400 KHz is 0.25 msec. Hence, the frequency of the output clock signal of the oscillator is 100 MHz. The number of clock pulses during the cycle period of 0.25 msec for loading the set value to the counter is 25,000. Assuming that the value set to the setting device is 25,000, the value received by the latch circuit is 0 if the frequency f is 400 KHz, while the number of the pulses corresponding to the difference is received by the latch circuit if the frequency is higher than 400 KHz. The data of the difference received by the latch circuit is converted to an analog signal by a digital-to-analog converter, and the converted analog signal is held in a peak-to-peak hold circuit. The peak-to-peak hold circuit holds the data of the difference between the latest maximum and the latest minimum values of the output of the digital-to-analog circuit every several tens of milliseconds, and accordingly, produces the data of the width $\Delta(1/f)$ of the variation of the cycle period. The produced data $\Delta(1/f)$ is used as the feedback signal for controlling the output of the power source.

However, the resolution obtained by the above-described prior art apparatus is low because the apparatus is of the digital sampling type. Also, there is a problem in that the automatic setting of the target value $\Delta(1/f)(T)$ cannot be carried out, since it is necessary for the operator to personally decide the target value by observing the color of the melt at the welding portion. Also, there is a problem in that the circuit structure of the above-described prior art apparatus is relatively complicated.

An apparatus for monitoring a welding phenomenon by the digital measurement concerning the welding characteristic in a high frequency welding is disclosed in, for example, U.S. Pat. No. 4,254,323 assigned to Nippon Steel Corporation.

DISCLOSURE OF THE INVENTION

It is an object of the present invention to provide an improved apparatus for automatically controlling a heat input by a high frequency power source for welding in which an automatic setting of a target value is possible and it is possible to obtain the measured value with a high precision by measurement with a high resolution.

In accordance with the fundamental aspect of the present invention, there is provided a method for automatically controlling heat input by a high frequency power source for welding, characterized in that the method includes the steps of: detecting variations in an output frequency of a high frequency oscillation power source for high frequency welding of a steel tube; deriving a frequency variation width ($\Delta f$) as the difference between maximum and minimum values of the resulting output of the detection of the variations of the output frequency; deriving a target value ($\Delta f(T)$) of the frequency variation width based on the maximum value of frequency level of rate of change of oscillation frequency; and controlling an output of the high frequency power source to make the frequency variation width ($\Delta f$) equal to the target value ($\Delta f(T)$) of the frequency variation width.

In accordance with another aspect of the present invention there is provided an apparatus for automatically controlling a heat input by a high frequency power source for welding, characterized in that the apparatus includes: a high frequency power source for high frequency welding of a steel tube; a detection circuit for detecting variations in an output frequency of the high frequency power source; a peak-to-peak hold circuit for outputting a frequency variation width ($\Delta f$) as the difference between maximum and minimum values of the output of the detection circuit; a target value generation circuit for generating a target value ($\Delta f(T)$); and a control circuit for controlling the output power of the high frequency variation width ($\Delta f$) equal to the target value ($\Delta f(T)$).

In the apparatus according to the present invention, the simplification of the circuit, and the high resolution of the measured value are attained by adopting difference $\Delta f$ of variation of frequency instead of the width $\Delta(1/f)$ of variation of cycle period as a difference and using a phase locked loop circuit (PLL circuit) or a frequency-to-voltage converter. Also, the target value of the width $\Delta f$ of variation of frequency can be automatically determined by holding the value $\Delta f$ when the frequency of f(p) becomes the maximum, that is, when the frequency level of rate of change of oscillation frequency assumes the maximum value.

BEST MODE FOR CARRYING OUT THE INVENTION

Before commencing the explanation of an embodiment according to the best mode, a prior art apparatus and the first, second, and third types of welding phenomena will be explained with reference to FIGS. 1, 2, and 3.

Figure 1:
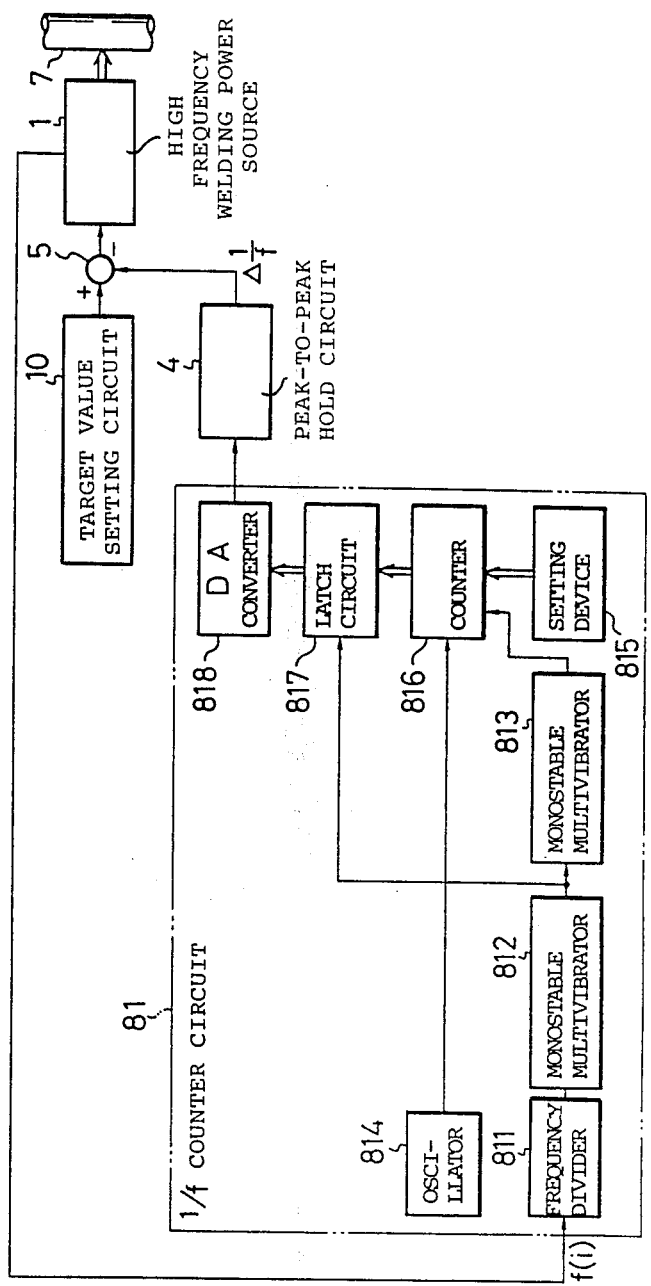
FIG. 1 is a block diagram of a prior art apparatus for automatically controlling heat input by a high frequency power source for welding.

In the apparatus of FIG. 1, the inverse of the width $\Delta f$ of frequency variation, and accordingly, the width $\Delta(1/f)$ of the cycle period variation are detected and the output power of the high frequency power source 1 for welding is controlled so as to make the detected width $\Delta(1/f)$ of cycle period variation equal to the optimal value $\Delta(1/f)(T)$. The steel pipe 7 to be welded is a load of the high frequency oscillation circuit of a power source 1, and, when the welding state is changed and the position of welding point is changed, the welding state of the steel pipe influences the frequency f(i) of the high frequency oscillation circuit, and the frequency of the high frequency oscillation circuit is changed.

The signal of frequency f(i) is supplied to the frequency inverse counting circuit 81 for counting the inverse (1/f) of the frequency. In the frequency inverse counting circuit 81, the signal is frequency divided by 100 in the frequency divider 811, and the rising or falling point of the frequency divided output signal f/100 causes the generation of pulses by the monostable multivibrators 812 and 813. The generated pulses are supplied to the counter 816. The output of the counter 816 is supplied to the latch circuit 817. The output pulse of the monostable multivibrator 812, which is the first appearing rising point detection pulse, is received by the latch circuit 817 of the counter 816, while the output pulse of the monostable multivibrator 813, which is the later appearing falling point detection pulse, causes the value set in the setting device 815 to be received by the counter 816. Upon loading of the set value, the counter carries out the down-counting of the output pulses of the oscillator 814 from the set value and outputs data of a remainder value. The count at the moment when the monostable multivibrator 812 produces an output, that is, the remainder of the subtraction of the count of the output pulses of the oscillator 814 from the set value, is received by the latch circuit 817.

The frequency f(i) is, for example, 400 KHz. Hence, the cycle period of the frequency division by 100 of this frequency is 0.25 msec, the frequency of the output clock signal of the oscillator 814 is 100 MHz, and the number of clock pulses in the cycle period 0.25 msec during which the set value is loaded in the counter 816 is 25,000.

Assuming that the value set to the setting device 815 is 25,000, the value received by the latch circuit is 0 if f=400 KHz, while a number of pulses corresponding to the difference are received by the latch circuit 817 if f>400 KHz. This number of pulses received by the latch circuit 817 is converted to an analog signal by the digital-to-analog converter 818, and the converted analog signal is held by a peak-to-peak hold circuit 4. The peak-to-peak hold circuit 4 holds the difference between the maximum and the minimum values of the digital-to-analog converter 818 every several tens of milliseconds, and, accordingly, produces the width $\Delta(1/f)$ of variation of the cycle period. The produced width $\Delta(1/f)$ is used as a feedback signal for controlling the output of the power source 1. With regard to the apparatus of FIG. 1, the resolution of the operation of the apparatus is low, since the apparatus of FIG. 1 is a digital sampling type. Also, it is necessary for the operator to personally decide the target value $\Delta(1/f)(T)$ by observing the color of the melt at the welding portion, and hence, an automatic setting of the target value cannot be carried out. Also, the circuit structure of the apparatus is relatively complicated.

Figure 2:
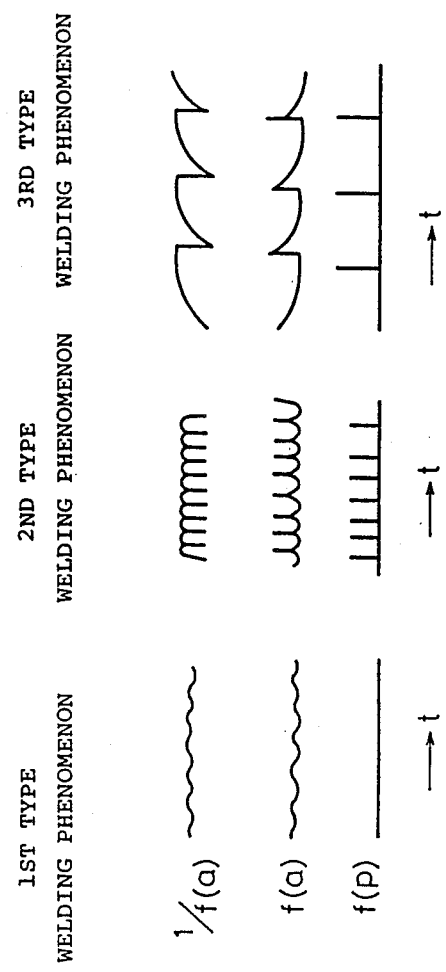
FIG. 2 shows waveforms of various forms of welding phenomena.

The first, second, and third types of welding phenomena are illustrated in FIG. 2. The relationships between the electrical power, and the width ($\Delta f$) of change of frequency and the frequency level of rate of change of the oscillation frequency are shown in FIG. 3. The frequency level of rate of change of the oscillation frequency is usually expressed as set point level (SPL).

Figure 4:
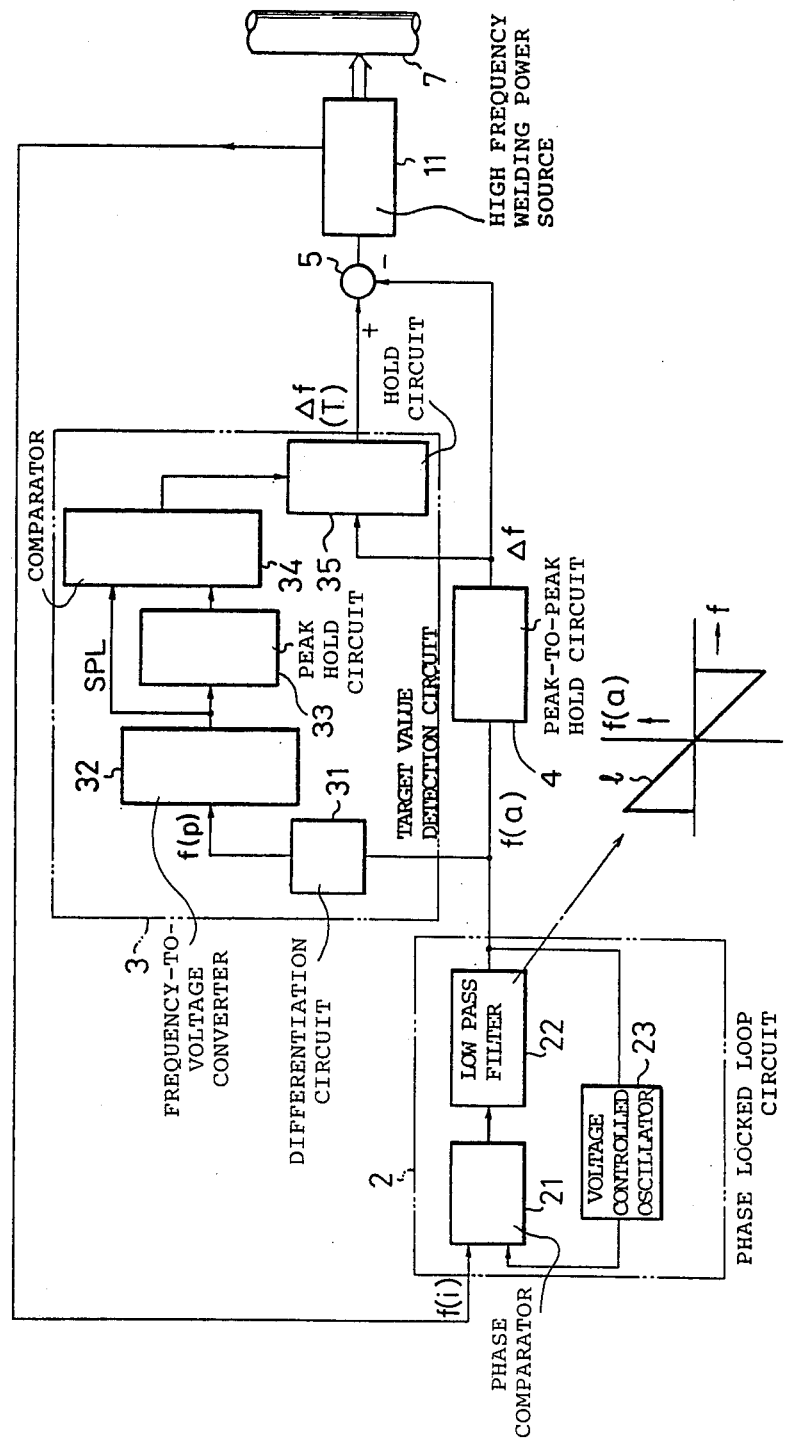
FIG. 4 shows an apparatus for automatically controlling heat input by a high frequency power source for welding.

An apparatus for automatically controlling the heat input by a high frequency power source as an embodiment according to the best mode of the present invention is shown in FIG. 4. The phase locked loop circuit 2 includes a phase comparator 21, a low pass filter 22, and a voltage controlled oscillator 23. The circuit 3 for detecting a target value of $\Delta f$ includes a differentiation circuit 31, a frequency-to-voltage converter 32, a peak hold circuit 33, a hold circuit 35, and a comparator circuit 34.

When the signal of the output frequency f(i) of the welding power source 1 is supplied to the phase comparator 21 in the phase locked loop circuit 2, the phase comparator 21 produces an output corresponding to the phase difference between the supplied signal and the output of the voltage controlled oscillator (VCO) 23. The output frequency of the voltage controlled oscillator 23 is preliminarily adjusted to be within an allowance of about ±5% from the frequency f(i). The high frequency component of the output of the phase comparator 21 is eliminated by the filter 22. The output of the filter 22 is supplied to the voltage controlled oscillator 23 to change the output frequency of the voltage controlled oscillator to eliminate the phase difference from the input signal f(i).

Thus, the output frequency of the voltage controlled oscillator 23 follows the input frequency. Under this condition, the relationship between the amplitude f(a) of the frequency signal which is the output of the filter 22 and the input frequency f(i) is represented by a straight line 1, and f(a) corresponds to the change of f(i). Instead of this voltage-controlled oscillator, a frequency to voltage converter other than the PLL type may be used. After that, the peak-to-peak hold circuit 4 carries out the peak-to-peak holding of the differences between the maximum and the minimum values of such f(a) and produces the variation $\Delta f$ of frequency. The peak-to-peak hold circuit 4 is arranged such that the latest f is obtained every several tens of milliseconds, and the obtained $\Delta f$ may be displayed on a $\Delta f$ display device (not shown) to be connected to the output terminal of the peak-to-peak hold circuit 4. The difference between the $\Delta f$ and a target value $\Delta f(T)$ controls the output power of the high frequency power source 1 for welding to make this difference zero. In the apparatus of FIG. 4, the phase locked loop circuit 2 has replaced the counter circuit for counting the inverse of the frequency in the prior art apparatus so that a simple circuit structure is realized.

The signal of the target value $\Delta f(T)$ is produced from the target value detection circuit 3. In the target value detection circuit 3, the output f(a) of the filter is differentiated by the differentiation circuit 31, and pulse signals are produced accordingly. The waveforms of the output f(a) of the filter 22 and the output f(p) of the differentiation circuit 31 are as shown in FIG. 2 in accordance with the first to third types of welding phenomena. The frequency of the output f(p) is converted to an analog voltage (SPL), by the frequency-to-voltage converter 32, and the converted analog voltage is displayed on a SPL meter (not shown) to be connected to the output terminal of the frequency-to-voltage converter 32 and supplied to the peak hold circuit 33 and the comparator circuit 34. The comparator circuit 34 compares the peak value $SPL_m$ of the SPL delivered from the peak hold circuit 33 and the current value of SPL delivered from the frequency-to-voltage converter 32. As a result of the comparison, when $SPL_m > SPL$, the comparator circuit produces an output signal. Thus, the value $\Delta f$ at the moment when SPL assumes the maximum value is taken into the hold circuit 35, and the hold circuit delivers $\Delta f(T)$ as output.

Figure 3:
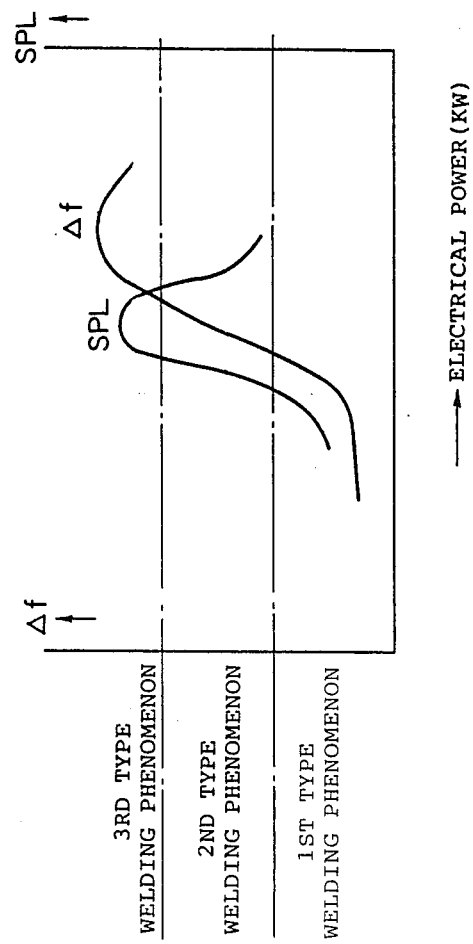
FIG. 3 shows the characteristic of the relationship between the electric power, and the width of change of the frequency and the frequency level of rate of change of oscillation frequency.

The changes of $\Delta f$ and SPL in accordance with the output electrical power kW of the high frequency power source for welding are illustrated in FIG. 3. First, $\Delta f$ is increased in accordance with the increase of the output electrical power kW and, later, is decreased after attainment of the peak value. The range approximate to the maximum of the rate of increase, that is, the point where SPL assumes the maximum value, approximately corresponds to the second type of welding phenomenon. The target value outputting circuit 30 utilizes the above-described fact. The receipt of $\Delta f$ by the hold circuit 35 at the start of the apparatus, that is, the decision of $\Delta f(T)$, is carried out while increasing the output electrical power KW of the high frequency power source 1 by a main control system, not shown in the drawings. After the receipt of $\Delta f$, the operation of receiving is prohibited, and the control proceeds to the control process using $\Delta f(T)$ as a reference value.

In the apparatus of FIG. 4, the circuit for measuring the optimal heat input control index $\Delta f$ is simplified to a great extent, the precision of measurement is enhanced, and an economical apparatus is realized. The setting of the optimal target value as the target values of $\Delta f$, which differ in accordance with the materials of the tube to be welded, is determined automatically by SPL signal so that a very advantageous apparatus is realized.

We claim:

1. A method for automatically controlling heat input by a high frequency power source for welding, characterized in that said method comprises the steps of:
    detecting variations in an output frequency of a high frequency oscillation power source for high frequency welding of a steel tube;
    deriving a frequency variation width ($\Delta f$) as the difference between maximum and minimum values of the resulting output of said detection of the variations of the output frequency;
    deriving a target value ($\Delta f(T)$) of a frequency variation width based on the maximum value of frequency level of rate of change of oscillation frequency; and
    controlling an output of said high frequency power source to make said frequency variation width ($\Delta f$) equal to said target value ($\Delta f(T)$) of the frequency variation width.

2. An apparatus for automatically controlling a heat input by a high frequency power source for welding, characterized in that said apparatus comprises:
    a high frequency power source for high frequency welding of a steel tube;

a detection circuit for detecting variations in an output frequency of said high frequency power source;

a peak-to-peak hold circuit for outputting a frequency variation width ($\Delta f$) as the difference between maximum and minimum values of the output of said detection circuit;

a target value generation circuit for generating a target value ($\Delta f(T)$) of said frequency variation width ($\Delta f$); and a control circuit for controlling the output power of said high frequency power source to make said frequency variation width ($\Delta f$) equal to said target value ($\Delta f(T)$).

3. An apparatus according to claim 2, wherein said target value determination circuit comprises:

a differentiation circuit for differentiating the output of said detection circuit;

a frequency-to-voltage converter for frequency-to-voltage converting the output of said differentiation circuit;

a peak hold circuit for holding the maximum value of said frequency-to-voltage converter; and a hold circuit for receiving the frequency variation width ($\Delta f$) at the moment when the output of said frequency-to-voltage converter becomes smaller than the output of said peak hold circuit and outputting said received frequency variation width as a target value ($\Delta f(T)$).

* * * * *